US012772977B2

(12) United States Patent
Fregonese et al.

(10) Patent No.: US 12,772,977 B2
(45) Date of Patent: Oct. 27, 2026

(54) USE OF BENZYL ALCOHOL AS A HERBICIDE

(71) Applicant: INNOVI, Layrac (FR)

(72) Inventors: Alexandra Fregonese, Moncaut (FR); Alexandre Eveillard, Moirax (FR)

(73) Assignee: INNOVI, Layrac (FR)

( * ) Notice: Subject to any disclaimer, the term of this patent is extended or adjusted under 35 U.S.C. 154(b) by 1224 days.

(21) Appl. No.: 17/620,611

(22) PCT Filed: Jun. 22, 2020

(86) PCT No.: PCT/FR2020/051084
§ 371 (c)(1),
(2) Date: Jun. 3, 2022

(87) PCT Pub. No.: WO2020/254776
PCT Pub. Date: Dec. 24, 2020

(65) Prior Publication Data

US 2022/0338473 A1 Oct. 27, 2022

(30) Foreign Application Priority Data

Jun. 20, 2019 (FR) ....................................... 1906692

(51) Int. Cl.

| | |
|---|---|
| ***A01N 31/04*** | (2006.01) |
| ***A01N 33/22*** | (2006.01) |
| ***A01N 37/02*** | (2006.01) |
| ***A01N 37/10*** | (2006.01) |
| ***A01N 37/40*** | (2006.01) |
| ***A01N 41/10*** | (2006.01) |
| ***A01N 43/40*** | (2006.01) |
| ***A01N 47/22*** | (2006.01) |
| ***A01N 57/20*** | (2006.01) |
| ***A01N 63/50*** | (2020.01) |
| ***A01P 13/00*** | (2006.01) |

(52) U.S. Cl.
CPC ............. *A01N 31/04* (2013.01); *A01N 33/22* (2013.01); *A01N 37/02* (2013.01); *A01N 37/10* (2013.01); *A01N 37/40* (2013.01); *A01N 41/10* (2013.01); *A01N 43/40* (2013.01); *A01N 47/22* (2013.01); *A01N 57/20* (2013.01); *A01N 63/50* (2020.01); *A01P 13/00* (2021.08)

(58) Field of Classification Search
CPC ........ A01N 31/04; A01N 37/10; A01N 37/40; A01N 57/20; A01N 63/50; A01N 33/22; A01N 37/02; A01N 41/10; A01N 43/40; A01N 47/22; A01N 37/46; A01P 13/00
See application file for complete search history.

(56) References Cited

U.S. PATENT DOCUMENTS 3,879,191 A 4/1975 Lavanish
8,921,271 B2 * 12/2014 Yamada ............... A01N 43/707
504/136

FOREIGN PATENT DOCUMENTS

| | | |
|---|---|---|
| WO | 00/51436 | 9/2000 |
| WO | 01/26457 | 4/2001 |
| WO | 01/41569 | 6/2001 |
| WO | 2006/052228 | 5/2006 |
| WO | 2008/017378 | 2/2008 |
| WO | 2012/167815 | 12/2012 |
| WO | 2014/066057 | 5/2014 |

OTHER PUBLICATIONS

International Search Report for PCT/FR2020/51084 dated Oct. 1, 2020, 5 pages.
Written Opinion of the ISA for PCT/FR2020/51084 dated Oct. 1, 2020, 5 pages.
Norval, et al., "Responses of the ticks *Amblyomma hebraeum* and *A. variegatum* to known or potential components of the aggregation-attachment pheromone. III. Aggregation", Experimental & Applied Acarology, vol. 16, 1992, pp. 237-245 (9 pp).
Chen, Yebing et al., "Allelopathy of Flower of *Parthenium hysterophorus* L. on *Echinochloa crusgalli* (L.) Beauv and the Isolation and Identification of Allelochemicals", Acta Phytophylacica Sinica, vol. 37, No. 1, Feb. 2010, pp. 73-77.

* cited by examiner

*Primary Examiner* — Sahana S Kaup
*Assistant Examiner* — Andriae M Holt
(74) *Attorney, Agent, or Firm* — NIXON & VANDERHYE

(57) ABSTRACT

Disclosed is a method for controlling weeds or undesired plants, which includes applying a composition including the benzyl alcohol herbicide to harmful or undesired plants, or to parts of these harmful or undesired plants, or else to the fields where these weeds or undesired plants are growing.

11 Claims, 2 Drawing Sheets view from above side view

Foliar application to pink petunia

T0 24 h 48 h

Outdoor effect (Example 5, assay no. 3)

T0 12 h 24 h

Outdoor effect (Example 5, assay no. 4)

USE OF BENZYL ALCOHOL AS A HERBICIDE

BACKGROUND OF THE INVENTION

Field of the Invention

The invention relates to the use of benzyl alcohol as a herbicide, in particular as a systemic herbicide.

Description of the Related Art

Pesticides are natural or synthetic chemical substances used in agriculture to control different sorts of pests (diseases, vermin and noxious plants) apart from products for medical and veterinary use.

Herbicides are differentiated from pesticides.

Pesticides are intended to protect crops against insects, diseases and weeds.

They are used in agriculture to destroy or combat crop pests or to treat stored products such as:

- seeds or cereals kept in silos, which can be spoilt by mould, fungi or also destroyed by certain insects;
- fruits, the preservation of which must ensure sanitary, taste and organoleptic qualities;
- in silviculture during the production of wood, to limit the action of insects and fungi,
- during weed control actions, for preparing forested land, clearing conifers for example, or also destroying any species harmful to the development of tree species;
- storing wood before sale and use also requires the use of fungicides and insecticides to limit any spoiling;
- for weed control in uncultivated areas, railways, fenced enclosures, power lines, public garden paths, lawns or also the banks of recreational waters;
- for weed control in cultivated areas;
- for topkilling, namely the partial or total destruction of the stems and leaves of tubers (such as potatoes, beetroot, etc.) for the purpose of facilitating mechanized harvesting using harvesters and improving the quality of the tubers (preservation, protection from diseases) or limiting their size.

By "pesticide" is meant a substance used to neutralize or destroy vermin, a vector of human or animal disease, a plant or animal species that is harmful or troublesome during the production or storage of agricultural products.

By "herbicide" is meant a substance used, in particular, to neutralize or destroy a plant species that is harmful or troublesome during the production or storage of agricultural products, or in the applications mentioned previously which do not involve the harmful action of a vermin animal or a microorganism.

In particular, a herbicide can be used to eliminate harmful or undesired plants from certain cultivated or uncultivated areas or land, in particular for weed control in cultivated areas (in particular intercrop areas), uncultivated areas, railways, fenced enclosures, power lines, public garden paths, lawns or also the banks of recreational waters, etc., or also for topkilling.

Herbicides disrupt the functioning of the physiology of the plant, its growth and/or the biosynthesis of the cellular components.

Herbicides represent 40% of the pesticides used in agriculture and, currently the inhibition of photosynthesis is one of the most common modes of action of these active materials.

The use of herbicides can also be carried out in addition to or in the place of actions for extraction from the banks of bodies of water, quarries etc., for treating livestock buildings, equipment for the storage and transport of animals, dairy equipment, etc.

In the present description, the terms "vegetable" or "plant" will be used interchangeably. By "noxious plant" or "undesired plant" or "undesirable plant" is meant a plant the sprouting or growth of which is not desired, and which it is desired to destroy and of which it is desired to limit the development, in particular plants commonly called "weed" or "adventive plant".

The Commission des essais biologiques (CEB) de l'Association française de protection des plantes [Bioassay Commission (CEB) of the French Association for the Protection of Plants] classes herbicides according to their mode of penetration, the type of migration via the distribution organs of the plant and the selectivity with regard to the plants.

Thus, in terms of the mode of penetration, the following are differentiated:

- herbicides with penetration through the soil: they penetrate through the underground organs of the plants (roots, seeds, plantlets). They are used as a pre-emergence herbicide treatment, carried out on the seed before the emergence of the plant in question (cultivated plant or noxious plant), and as a preventative herbicide on areas without plants but affected by the habitual presence of adventive plants; and
- herbicides with foliar penetration: applied to the foliage, they penetrate through the above-ground organs of the plants (leaves, petioles, stems). They are used as a post-emergence herbicide treatment, carried out after the emergence of the plant in question (cultivated plant or noxious plant).

Herbicides can act via one or other of these modes of penetration, or both.

In terms of migration via the distribution organs of the plant, the following are differentiated:

- contact herbicides, which act after a deeper or shallower penetration into the tissues, without any migration from one organ to another of the treated plant; and
- systemic herbicides, capable of acting after penetration and/or migration from one organ to another of the treated plant.

In terms of selectivity, the following are differentiated:

- selective herbicides, which destroy one or more identified species, whether cultivatable or not, without affecting other species, whether cultivatable or not;
- total or non-selective herbicides, which, when they are used in the recommended doses, are capable of destroying or preventing the development of all plants, with variable persistence of action.

Weeds can cause yield losses of between a third and half of the harvest. However, the systematic use of herbicides has limits and the range of resistance mechanisms to herbicides in the population of adventive plants is a concern.

The use of herbicides is necessary to prevent weeds from competing with cultivated plants for the use of environmental resources: light, water, nutrients, space.

In parallel with the problem of the effectiveness of chemical control of adventive plants, agriculture is subject to new environmental and ecological constraints aiming to reduce the use of pesticides. Yet, by applying doses of herbicides lower than those that are recommended, the risk of selecting resistance increases.

However, while the number of authorized active substances is decreasing, in particular in France, few new products are being marketed. The products remaining on the market to combat noxious or undesired plants are thus used in an increasingly recurrent manner, increasing the risk of resistance selection, in particular by modifying the frequency of the resistant and sensitive individuals in a population.

In fact, when a herbicide is repeatedly applied, the sensitive individuals are killed, which gives the resistant individuals a very strong selective advantage which allows them to proliferate. At the end of a variable number of years, the frequency of resistant individuals becomes a concern. Different factors associated with the adventive species and the characteristics of the herbicide promote the development of resistance.

It is therefore sought to have a herbicide which acts not only by contact, but also by the systemic route. It is also sought that this herbicide is, preferably, non-selective, so that it is effective regardless of the plant family and/or species to be eliminated. Also, it is desired that its use makes it possible to limit the appearance of herbicide resistance phenomena. Finally, a herbicide is sought which has a low level of toxicity with regard to human beings and the environment.

It has now been found that benzyl alcohol presented the desired herbicide properties, in particular in terms of the effectiveness and the reduction of resistance phenomena, the systemic nature and the non-selectivity.

It has also been found that benzyl alcohol did not present any activity that is corrosive to metals, which is an advantage for the use of agricultural, gardening equipment, etc.

Benzyl alcohol is produced naturally by numerous plants, such as ylang-ylang, jasmine, apricot, almond or blackcurrant. It is also found in a variety of essential oils. Also called hydroxytoluene or toluenol, benzyl alcohol can be prepared industrially in a number of ways. It can be of plant or synthetic origin.

It is a preservative authorized by Ecocert, the French organization for control and certification of biological products. It is formed by the action of potassium hydroxide on benzaldehyde, which is the simplest aromatic aldehyde.

Aromatic aldehydes used at the recommended doses do not have a currently known toxicity. Benzyl alcohol is used as a multipurpose solvent, as a precursor for several esters and in the manufacture of soaps. It is found in the composition of more than 20% of cosmetic products.

As a food additive, benzyl alcohol is classified as "generally regarded as safe" (GRAS) by the American organization FDA (Food and Drug Administration).

Benzyl alcohol can also be used as a solvent in herbicide compositions, as described, for example in applications WO2014/0660557 and WO2008/017378. The use of a benzyl alcohol derivative, butylated hydroxytoluene (BHT), as an antioxidant in a pesticide or herbicide composition is also described, for example, in applications WO01/26457 and WO2006/052228.

U.S. Pat. No. 3,879,191 relates to substituted benzyl alcohol derivatives having chemical structures that are very different from benzyl alcohol, through their number of carbon, hydrogen and oxygen atoms.

The compounds tested in the examples are used in mixtures of solvents which are themselves highly toxic (acetone, methanol, DMF). In addition, the tests carried out show an activity measured by lesions, revealing a defoliant activity and not a herbicidal activity.

Application WO00/51436 describes defoliant compositions containing essential oils and mixtures thereof. Example 3 describes the topical application of a mixture for aerosolizing essential plant oils consisting of eugenol, 2-phenethyl propionate, benzyl alcohol and peppermint oil on different plants or on oaks, to eliminate green materials. This test does not make it possible to attribute an activity to benzyl alcohol among the other compounds of the mixture.

However, the herbicide activity of benzyl alcohol is not described, or suggested, in the state of the art.

SUMMARY OF THE INVENTION

According to a first aspect, an aim of the invention is thus the use of benzyl alcohol as a herbicide. Benzyl alcohol can be the only active substance or be used in combination with at least one co-herbicide. Non-limitative examples of co-herbicides are cited below.

In the present description, the terms "in combination with a co-herbicide" and "in association with a co-herbicide" will be used interchangeably.

According to the invention, benzyl alcohol can be used, in particular, in all the weed control and topkilling actions mentioned previously.

Advantageously, the herbicide activity of benzyl alcohol is systemic.

An aim of the invention is thus, according to one of its aspects, the use of benzyl alcohol as a systemic herbicide.

An aim of using benzyl alcohol as a herbicide, in particular as a systemic herbicide, is to control noxious or undesirable plants.

As mentioned above, a systemic herbicide is capable of acting after penetration and/or migration from one organ to another of the treated plant.

The systemic activity makes use of the circulation of the sap, owing to a continuous process in the organs of the plant.

The circulation of the sap is mainly caused by plant evapotranspiration, which takes place essentially at the level of the stomata.

Evapotranspiration is the continuous process caused by the evaporation of water through the leaves and the corresponding take-up from the roots in the soil. Thus, plant evapotranspiration and the circulation of the sap are physiological mechanisms of the living and rooted plant.

According to another aspect of the invention, the herbicide activity of benzyl alcohol is by above-ground (foliar) and/or underground (roots and/or seeds) penetration. Thus, the herbicide activity of benzyl alcohol is carried out by penetration via the above-ground and/or underground parts of the plant. This activity makes it possible to prevent germination, in a preventative use, but also to prevent plants originating from seeds from sprouting again, after treatment of the area.

Advantageously, the herbicide activity of benzyl alcohol can also be preventative by preventing the germination of the seeds of noxious or undesirable plants or their pre-emergence, by sprinkling areas without plants but habitually affected by the presence of adventive plants. The application will take place before their appearance. The herbicide activity of benzyl alcohol can also be preventative during pre-emergence by treating the surface of a previously deeply seeded cultivated area.

According to an aspect of the invention, the preventative herbicide activity is carried out by sprinkling areas containing seeds.

Advantageously, the herbicide activity of benzyl alcohol is non-selective, i.e. it acts, in variable doses, on all species.

According to the invention, the noxious or undesired plants are selected from all of the plants of the green lineage (or Archaeplastida), and more particularly from monocotyledon plants, dicotyledon plants and pteridophytes, such as, for example, those mentioned below.

The dosage of benzyl alcohol (quantity per hectare) that makes it possible to obtain the desired herbicide activity can be adapted depending on the noxious or undesirable plants to be treated and the mode of application.

The dosage prescribed for a foliar application or a systemic application is variable depending on the height of the plant, its density over a given surface area, the number of varieties present on the area to be treated and the type of plants.

Benzyl alcohol will be used in particular, alone or in combination with at least one co-herbicide, at a rate of 5 L/hectare to 800 L/hectare, preferably 50 L/hectare to 500 L/hectare, in particular 50 L/hectare to 300 L/hectare, for example 100 to 200 L/hectare.

According to an advantageous aspect, benzyl alcohol, alone or in combination with at least one co-herbicide, can be used at a rate of 5 L/hectare to 100 L/hectare, for example 10 L/hectare to 80 L/hectare, in particular 15 L/hectare to 60 L/hectare. High concentrations will be preferred for plants with creeping roots and grasses.

Benzyl alcohol can be used in pure or diluted form, for example diluted in water or in another liquid vehicle, or in the form of powder, pellets etc., the formulation being selected according to the desired use and the quantity to be used.

A subject of the present invention is also a method for controlling undesirable vegetation, i.e. noxious or undesired plants, which comprises the application of the herbicide benzyl alcohol to noxious or undesirable plants, or parts of these noxious or undesirable plants, or also on land where these noxious or undesirable plants sprout, for example on crop areas.

In the present description, the general or particular aspects of the invention apply interchangeably to the uses indicated previously and to the method for controlling undesirable vegetation.

In the context of the present invention, benzyl alcohol can be used pre- or post-emergence, on the seed, the plantlet (juvenile stage before flowering), the flowering plant (before, during or after pollination), the plant after fertilization, the plant during fructification, the fruit, the flowers, the leaves, the stems, the roots or in the soil, and/or the culture medium, before or after seeding or also intercrop or inter-row.

By "emergence" is meant the emergence of a plantlet from the ground.

By "intercrop" is meant a period comprised between two main crops, which starts with the harvest of the previous crop and ends with the seeding of the following crop.

By "inter-row" is meant an area between two rows of cultivated plants.

It is possible to treat plants cultivated outdoors or greenhouse plants or also plants cultivated without soil.

Benzyl alcohol can be applied by spraying, sprinkling or dispersion of powder or pellets.

In the case of a pre-emergence (also called "pre-emergent") application, spray application makes it possible to obtain a high concentration of active product in the upper layer of the soil. This concentration is particularly effective against shallow germinating weeds which originate from these layers, without impacting the seeds of plants that are not undesirable possibly present deep down. Advantageously, the pre-emergence application of benzyl alcohol can be carried out on damp soil, which makes it possible to use a smaller quantity of water or solvent for dampening the area to be treated.

In the present invention, by "control" is meant a reduction of the growth of noxious plants compared with untreated noxious plants.

Preferably, the growth of noxious or undesirable plants is reduced by at least 50%, in particular at least 60%, preferably at least 80%, and very particularly by 90 to 100%.

The noxious or undesirable plants which can be treated with the herbicide benzyl alcohol according to the invention can be plants of the green lineage or Archaeplastida, and more particularly monocotyledons or dicotyledons, or also pteridophytes.

Of the monocotyledon plants, there may be mentioned, in particular, grasses and couch grasses.

Of the dicotyledon plants, there may be mentioned, in particular, herbaceous plants, legumes, such as clover, the Rosaceae such as brambles, or the Asteraceae, such as thistles.

Of the pteridophytes, there may be mentioned, for example, ferns or horsetails. By way of example of a noxious monocotyledon plant which can be treated, there may be mentioned those belonging to the genus *Hordeum* spp., *Echinochloa* spp., *Poa* spp., *Bromus* spp., *Digitaria* spp., *Eriochloa* spp., *Setaria* spp., *Pennisetum* spp., *Eleusine* spp., *Eragrostis* spp., *Panicum* spp., *Lolium* spp., *Brachiaria* spp., *Leptochloa* spp., *Avena* spp., *Cyperus* spp., *Axonopris* spp., *Sorghum* spp, and *Melinus* spp.

Particular examples of noxious monocotyledon plants on which the herbicide combinations and compositions according to the present invention acting effectively are selected from among the following species: *Hordeum murinum, Echinochloa crus-galli, Poa annua, Bromus rubens* L., *Bromus rigidus, Bromus secalinus* L., *Digitaria sanguinalis, Eriochloa gracilis, Setaria faberi, Setaria viridis, Pennisetum glaucum, Eleusine indica, Eragrostis pectinacea, Panicum miliaceum, Lolium multiflorum, Brachiaria platyphylla, Leptochloa fusca, Avena fatua, Cyperus compressus, Cyperus esculentes, Axonopris offinis, Sorghum halapense*, and *Melinus repens*.

By way of example of dicotyledon plants on which the herbicide combinations and compositions according to the present invention act effectively, there may be mentioned those belonging to the genus *Amaranthus* spp., *Polygonum* spp., *Medicago* spp., *Mollugo* spp., *Cyclospermum* spp., *Stellaria* spp., *Gnaphalium* spp., *Taraxacum* spp., *Oenothera* spp., *Amsinckia* spp., *Erodium* spp., *Erigeron* spp., *Senecio* spp., *Lamium* spp., *Kochia* spp., *Chenopodium* spp., *Lactuca* spp., *Malva* spp., *Ipomoea* spp., *Brassica* spp., *Sinapis* spp., *Urtica* spp., *Sida* spp., *Portulaca* spp., *Richardia* spp., *Ambrosia* spp., *Calandrinia* spp., *Sisymbrium* spp., *Sesbania* spp., *Capsella* spp., *Sonchus* spp., *Euphorbia* spp., *Helianthus* spp., *Coronopus* spp., *Salsola* spp., *Abutilon* spp., *Vicia* spp., *Epilobium* spp., *Cardamine* spp., *Picris* spp., *Trifolium* spp., *Galinsoga* spp., *Epimedium* spp., *Marchantia* spp., *Solanum* spp., *Oxalis* spp., *Metricaria* spp., *Plantago* spp., *Tribulus* spp., *Cenchrus* spp., *Bidens* spp., *Veronica* spp., and *Hypochaeris* spp.

Particular examples of noxious dicotyledon plants on which the herbicide combinations and compositions according to the present invention act effectively are selected from the following species: *Amaranthus spinosus, Polygonum convolvulus, Medicago polymorpha, Mollugo verticillata, Cyclospermum leptophyllum, Stellaria media, Gnaphalium purpureum, Taraxacum officinale, Oenothera laciniata,*

*Amsinckia intermedia, Erodium cicutarium, Erodium moschatum, Erigeron bonariensis, Senecio vulgaris, Lamium amplexicaule, Erigeron canadensis, Polygonum aviculare, Kochia scoparia, Chenopodium album, Lactuca serriola, Malva parvijlora, Malva neglecta, Ipomoea hederacea, Ipomoea lacunosa, Brassica nigra, Sinapis arvensis, Urtica dioica, Amaranthus blitoides, Amaranthus retroflexus, Amaranthus hybridus, Amaranthus lividus, Sida spinosa, Portulaca oleracea, Richardia scabra, Ambrosia artemisiifolia, Calandrinia caulescens, Sisymbrium irio, Sesbania exaltata, Capsella bursa-pastoris, Sonchus oleraceus, Euphorbia maculata, Helianthus annuus, Coronopus didymus, Salsola tragus, Abutilon theophrasti, Vicia benghalensis* L., *Epilobium paniculatum, Cardamine* spp., *Picris echioides, Trifolium* spp., *Galinsoga* spp., *Epimedium* spp., *Marchantia* spp., *Solanum* spp., *Oxalis* spp., *Metricaria matriccarioides, Plantago* spp., *Tribulus terrestris, Salsola kali, Cenchrus* spp., *Bidens bipinnata, Veronica* spp., and *Hypochaeris radicata.*

Benzyl alcohol can be used as a herbicide alone or in combination with a co-herbicide.

In this case, the use of benzyl alcohol and the co-herbicide can be simultaneous or sequential in order to increase the effectiveness of the latter and/or reduce its concentration with a view to reducing its toxicity.

Said co-herbicide can be selected from one or more herbicide compound(s), or, alternatively, one or more compound(s) which does (do) not have a herbicide activity but which is (are) capable of increasing and/or speeding up the herbicide activity of the benzyl alcohol (for example by reducing the quantities of active material to be used and/or by reducing the action time).

In particular, said co-herbicide can be selected from the compounds participating in the production of reactive oxygen species ("ROS"), such as, for example, salicylic acid, or the compounds acting on the plasma membrane, leading to its rupture or its fluidification, such as enzymes, in particular lysozyme, phenethyl alcohol or EDTA.

Said co-herbicide can be, for example, a molecular synthesis inhibitor, such as, for example pigment synthesis inhibitors, cellulose synthesis inhibitors (benzamides, alkylazines, nitriles or triazolocarboxamides), auxine transport inhibitors (semicarbazone, phthalamate), shikimic acid pathway inhibitors (glyphosate), auxine or auxinic herbicide synthesis inhibitors, such as, for example, phenoxy-alkanoic acid derivatives, in particular phenoxy carboxylic acids such as 2,4D (2,4-dichlorophenoxyacetic acid), 2-phenoxypropionic acids or phenoxybutyric acids, or benzoic acid and its derivatives, such as dicamba or sodium benzoate, pyridinic acid derivatives, such as, for example, fluoxypyr, triclopyr or clopyralid, quinoline carboxylic acid derivatives or pyrimidine carboxylic acid derivatives, cellular division inhibitors (acetamides, oxyacetamides, tetrazolines, chloroactamides), acetolactate synthase (ALS) inhibitors, 4-hydroxyphenylpyruvate dioxygenase (4-HPPD) inhibitors, phytoene desaturase (PDS) inhibitors, 1-deoxy-D-xylulose-5-phosphate synthase (DOXP) inhibitors, acetyl coenzyme A carboxylase (ACCase) inhibitors or photosystem II (PS II) inhibitors (urea, nitriles, etc.), or molecules the mode of action of which is not defined (pelargonic acid, vinegar).

The co-herbicide can be, for example, selected from one of the following herbicide compounds: acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, anisuron, asulam, atraton, atrazine, azafenidin, azimsulfuron, aziprotryne, barban, BCPC, beflubutamid, benazolin, bencarbazone, benfluralin, benfuresate, bensulfuron-methyl, bensulide, bentazone, benthiocarb, benzadox, benzfendizone, benzipram, benzobicyclon, benzofenap, benzofluor, benzoylprop, benzthiazuron, bicyclopyrone, bifenox, bilafos, bispyribac-sodium, borax, bromacil, bromacil, bromobonil, bromobutide, bromofenoxim, bromoxynil, brompyrazon, butachlor, butafenacil, butamifos, butenachlor, buthidazole, buthiuron, butralin, butroxydim and buturon, butyl butylate, cacodylic acid, cafenstrole, calcium chlorate, calcium cyanamide, cambendichlor, carbasulam, carbetamide, carboxazole, chlorprocarbone, carfentrazone (for example carfentrazone-ethyl), CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon (for example cinidon-ethyl), cinmethylin, cinosulfuron, cisanilide, clacyfos, clethodim, cliodinate, clodinafop-propargyl, clofop, clomazone, clomeprop, cloprop, cloproxydim, clopyralid, cloransulam-methyl, copper sulfate, credazine, cresol, cumyluron, cyanatryne, cyanazine, cycloate, cycloate, cyclopyrimorate, cyclosulfamuron, cycloxydim, cycluron, cyhalofop (for example cyhalofop-butyl), cyperquat, cyprazine, cyprazole, cypromide, daimuron, dalapon, dazomet, delachlor, desmedipham, desmetryn, di-allate, dicamba, dichlobenil, dichloralurea, dichlormate, dichlorprop, dichlorprop, dichlorprop-P, diclofop-methyl, diclosulam, diethamquat, diethatyl, diphenopentene, diphenoxuron, diphenzoquat, diflufenican, diflufenzopyr, dimefuron, dimepiperate, dimethachlor, dimethamidn, dimethenamid-P dimexano, dimidazon, dinitramine, dinofenate, dinoprop, dinosam, dinoseb, dinoterb, diphenamid, dipropetryn, diquat, disul, dithiopyr, diuron, eglinazine, endothal, epronaz, erbon, esprocarb, ethbenzamide, ethalfluralin, ethametsulfuron, ethidimuron, ethiolate, ethobenzamid, etobenzamid, ethofumesate, ethoxyfen, ethoxysulfuron, etinofen, etnipromid, etobenzanid, fenasulam, fenoprop, fenoxaprop (for example fenoxaprop-P-ethyl), fenoxaprop-P-ethyl+isoxadifen-ethyl, fenoxasulfone, fenquinotrione, fenteracol, fenthiaprop, fentrazamide, fenuron, ferrous sulfate, flamprop, flamprop-M, flazasulfuron, florasulam, fluazifop (for example fluazifop-P-butyl), fluazolate, flucarbazone, flucetosulfuron, fluchloralin, flufenacet, flufenican, flufenpyr (for example, flufenpyr-ethyl), flumetsulam, flumezin, flumiclorac (for example, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone and flurochloridone, fluroxypyr, flurtamone, fluthiacet, fluthiacet, fomesafen, foramsulfuron, fosamine, fumiclorac, furyloxyfen, halauxifen, halauxifen, halauxifen-methyl, halosafen, halosulfuron (for example halosulfuron-methyl), haloxydine, haloxyfop-methyl, haloxyfop-P (for example haloxyfop-P-methyl), hexachloroacetone, hexaflurate, hexazinone, imazamethabenz, imazamox, imazapic, imazapyr, imazaquin, imazosulfuron, indanofan, indaziflam, iodobonil and iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxaflutole, isoxapyrifop, karbutilate, ketospiradox, lancotrione, lactofen, lenacil, linuron, esters and amines, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methhazole, methiobencarb, methhiozolin, methhiuron, methometon, methoprotryne, methyl bromide, methyl isothiocyanate, methyldymron, metobenzuron, metobromuron, metolachlor, metosulam, metoxuron, metribuzin, metsulfuron, metsulfuron-methyl, molinate, monalide, monisouron, monochloroacetic acid, monolinuron, monuron, morfamquat, MSMA, naproanilide, napropamide, napropamide-M, naptalam, neburon, nicosulfuron, nipyraclofen, nitralin, nitrofen, nitrofluorfen, norflurazon, noruron, OCR, orbencarb, orthodichlorobenzene, orthosulfamuron, oryzalin, oxadiargyl, oxydiazon, oxapyrazon, oxasulfuron, oxaziclomefone, oxyfluorfen, paraflufen-ethyl, parafluron, paraquat, pebulate, pelargonic acid, pendimethalin, penoxsulam, pentachlorophenol, pentanochlor, pentoxazone, perfluidone, pethoxamid, phenisopham, phenmedipham, phenobenzuron, phenylmercuric acetate, picloram, picolinafen, pinoxaden, piperophos, potassium arsenite, potassium azide, potassium cyanate, pretilachlor, primisulfuron (for example, primisulfuron-methyl), procyazine, prodiamine, profluazol, profluazol, profluralin, profoxydim, proglinazine, prohexadione-calcium, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen (for example, pyraflufen-ethyl), pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxasulfone, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfomethuron, sulfosate, sulfosulfuron, sulfosulfuron, sulfuric acid, sulglycapin, tefuryltrione, tebuthiuron, tebutam, tebutam, sulglycapin, sweeping, TCA, tembotrione, tepraloxydim, terbacil, terbucarb, terbuchlor, terbumeton, terbuthylazine, terbutryn, tetrafluron, thenylchlor, thiazafluron, thiazopyr, thidiazimin, thidiazuron, thiencarbazone-methyl, thifensulfuron, thifensulfuron-methyl, thiobencarb, tiafenacil, tiocarbazil, tioclorim, tolpyralate, topramezone, tralkoxydim, triafamone, tri-allate, triasulfuron, triaziflam, tribenuron (for example, tribenuron-methyl), tricamba, triclopyr for example triclopyr choline salt), triclopyr esters and salts, tridiphane, trietazine, trifloxysulfuron, trifludimoxazin, trifluralin, triflusulfuron, trifop, trifopsime, trihydroxytriazine, trimeturon, tripropindan, tritac, tritosulfuron, vernolate, xylachlor and salts, choline salts, esters, optically active isomers and mixtures thereof.

The co-herbicide can also be selected from the sulfonylureas or the foliar anti-grass herbicides, such as, for example, FOP (aryloxyphenoxypropionate) and DIM (cyclohexanedione).

The co-herbicide can also consist of glyphosate or one of its salts, esters or other derivatives, or mixtures of these salts, esters or other derivatives with one another.

The glyphosate salts which can be used in this way are the mono-, di- or tribasic salts of glyphosate such as the ammonium salts (mono-, di- or triammonium), the alkali metal salts such as sodium or potassium, sulfonium and the organic ammonium salts of glyphosate.

The organic ammonium salts of glyphosate can be selected from the aliphatic or aromatic amine salts, and can include the primary, secondary, tertiary or quaternary amine salts.

Of the organic salts of glyphosate, there may be mentioned the salts of isopropylamine, n-propylamine, ethylamine, dimethylamine, monoethanolamine, ethylenediamine and hexamethylenediamine.

The salts of glyphosate which can be used can also consist of the salts of potassium, monoammonium, diammonium, sodium, monoethanolamine, n-propylamine, isopropylamine, ethylamine, dimethylamine, ethylenediamine, hexamethylenediamine, trimethylsulfonium and mixtures thereof.

The co-herbicide can consist of pelargonic acid. Compositions containing benzyl alcohol and pelargonic acid as active substances and their use as a herbicide, in particular as a systemic herbicide are subjects of the invention. These compositions have a herbicide activity.

Other advantageous co-herbicides are selected, for example, from benzoic acid, dicamba or 2,4-dichlorophenoxyacetic acid (2,4-D).

Advantageously, a compound which does not have a herbicide activity, but which, for example, increases the herbicide activity of the benzyl alcohol and/or speeds up its action can be used as co-herbicide. Such compounds can be selected, for example, from salicylic acid, sodium benzoate, phenethyl alcohol, lysozyme and EDTA.

A weight ratio between the herbicide benzyl alcohol and the co-herbicide which can be comprised between 150:1 and 1:150, preferably between 120:1 and 1:120, in particular between 100:1 and 1:100 or between 50:1 and 1:50, and in particular between 20:1 and 10:1, in particular between 20:1 and 5:1, is generally used.

In the present description, unless otherwise stated, the value ranges indicated are understood as inclusive of boundaries.

Benzyl alcohol, alone or in combination with at least one co-herbicide, can be formulated in a composition that can also contain one or more phytopharmaceutically acceptable additives or excipients. Such additives or excipients can be in solid form such as, for example, in the form of powder, pellets or wettable powder, or in liquid form such as, for example, emulsifiable concentrates, solutions, emulsions or suspensions, in order to improve the physicochemical characteristics, the stability of the product over time and/or some modes of application.

Benzyl alcohol can be present in said composition, for example, at a rate of 1 to 99% by weight, in particular 1 to 90% by weight, for example 5 to 90% by weight, in particular 10% to 80% by weight, more particularly 20% to 70%, with respect to the total weight of the composition.

Moreover, the additive or excipient can also be provided in the form of a pre-mix.

These excipients can in particular consist of one or more surfactants for the purpose of increasing the herbicide effect of the benzyl alcohol or, where necessary, of one or other of the co-herbicides mentioned previously.

These surfactants can be included in the composition containing the herbicide to facilitate retention of the herbicide by the plants, as well as to allow better absorption of the herbicide by the plants, in order to improve the effectiveness of the herbicide.

For example, the weight ratio between the total quantity of herbicide and surfactant can be comprised between 0.5:100 and 100:1, in particular between 0.5:50 and 50:1, more particularly between 0.5:20 and 20:1, in particular between 1:20 and 10:1, in particular between 1:10 and 5:0.5.

The surfactants which can be used can be selected from the alkoxylated tertiary ether amines, the alkoxylated quaternary ether amines, the alkoxylated ether amine oxides, the alkoxylated tertiary amines, the alkoxylated quaternary amines, the alkoxylated polyamines, the sulfates, the sulfonates, the phosphate esters, the alkylpolysaccharides, the alkoxylated alcohols, the amidoalkylamines and combinations thereof.

Of the examples of surfactants based on alkoxylated tertiary ether amine, there may be mentioned the surfactants of the TOMAH E series, such as TOMAH E-14-2 (bis-(2-hydroxyethyl) isodecyloxypropylamine), TOMAH E-14-5 (poly(5)oxyethylene isodecyloxypropyloxypropylamine), TOMAH E-17-2, TOMAH E-17-5 (poly(5)oxyethylene isotridecyloxypropyl amine), TOMAH E-19-2, TOMAH E-18-2, TOMAH E-18-5 (poly(5)oxyethylene octadecylamine), TOMAH E18-15, TOMAH E-19-2 (bis-(2-hydroxyethyl) linear alkyloxypropylamine), TOMAH E-S-2, TOMAH E-S-15, TOMAH E-T-2 (bis-(2-hydroxyethyl) tallow amine), TOMAH E-T-T-5 (poly(5)oxyethylene tallow amine) and TOMAH E-T-15 (poly(15)oxyethylene tallow amine), all available from Air Products and Chemicals, Inc. The alkoxylated quaternary surfactants based on ether amine intended to be used in the herbicide mixtures and compositions described in the present document comprise, for example, TOMAH Q-14-2, TOMAH Q-17-2, TOMAH Q-17-5, TOMAH Q-18-2, TOMAH Q-S, TOMAH Q-S-S-80, TOMAH Q-D-T, TOMAH Q-DT-HG, TOMAH Q-C-15, and TOMAH Q-ST-50, all available from Air Products and Chemicals, Inc.

Of the examples of surfactants based on alkoxylated ether amine oxide, there may be mentioned the surfactants of the TOMAH AO series, such as TOMAH AO-14-2, TOMAH AO-728, TOMAH AO-17-7, TOMAH AO-405 and TOMAH AO-455, all available from Air Products and Chemicals, Inc. The alkoxylated tertiary amine oxide surfactant agents comprise, for example, all of the surfactants of the AROMOX series, including AROMOX C/12, AROMOX C/12W, AROMOX DMC, AROMOX DM16, AROMOX DMHT and AROMOX T/12 DEG, all of these products are available from Akzo Nobel.

The alkoxylated tertiary amine surfactants comprise, for example, ETHOMEEN T/12, ETHOMEEN T/20, ETHOMEEN T/25, ETHOMEEN T/30, ETHOMEEN T/60, ETHOMEEN C/12, ETHOMEEN C/15 and ETHOMEEN C/25, which are all available from Akzo Nobel. The surfactants based on alkoxylated quaternary amines comprise, for example, ETHOQUAD T/12, ETHOQUAD T/20, ETHOQUAD T/25, ETHOQUAD C/12, ETHOQUAD C/15 and ETHOQUAD C/25, which are all available from Akzo Nobel.

The alkoxylated polyamine surfactants comprise, for example, the ethoxylates of ADOGEN 560 (N-coco propylene diamine) containing an average of 2EO to 20EO, for, for example 4.8, 10 or 13.4EO; the ethoxylates of ADOGEN 770 (N-tallow propylenediamine) containing an average of 2EO to 20EO, for example 13EO; and the ethoxylates of ADOGEN 670 (N-tallow propylenetriamine) containing an average of 3EO to 20EO, for example, 14.9EO, all available from Witco Corp. Other polyamine surfactants intended to be used in Triamine C, Triamine OV, Triamine T, Triamine YT, Triamine YT, Triameen Y12D, Triameen Y12D-30, Tetrameen OV, Tetrameen T3 are all available from Akzo Nobel. The sulfated surfactants comprise, for example, sodium nonylphenol ethoxylate sulfate (4 EO), sodium nonylphenol ethoxylate sulfate (10 EO), WITCOLATE 1247H, WITCOLATE 7093, WITCOLATE 7259, WITCOLATE 1276, WITCOLATE LES-60A, WITCOLATE LES-60C, WITCOLATE 1050, WITCOLATE WAQ, WITCOLATE D-51-51 and WITCOLATE D51-53, all available from Witco Corp. The sulfonate surfactants comprise, for example, WITCONATE 93S, WITCONATE NAS-8, WITCONATE AOS, WITCONATE 60T and WITCONATE 60T WITCONATE 605, which are all available from Witco Corp.

The phosphate esters of the alkoxylated surfactants comprise, for example, EMPHOS CS-121, EMPHOS PS-400 and WITCONATE D-51-29, available from Witco Corp. Other examples include the surfactants agents of the PHOSPHOLAN series available from Akzo Nobel.

The alkyl polysaccharides constitute another category of suitable surfactant agents. By way of example of an alkyl polysaccharide surfactant agent, there may be mentioned the alkyl polyglucoside surfactant agents (APG) such as AGNIQUE PG8107-G (AGRIMUL PG2067) available from BASF. As another alkyl polysaccharide surfactant, there may be mentioned APG 225, APG 325, APG 425, APG 625, GLUCOPON 600, PLANTAIRE 600, PLANTAIRE 1200, PLANTAIRE 1300, PLANTAIRE 2000, AGRIMUL PG 2076, AGRIMUL PG 2067, AGRIMUL PG 2072, AGRIMUL PG 2069, AGRIMUL PG 2062, AGRIMUL PG 206S and BEROL AG 6202.

The alkoxylated surfactants comprise, for example, EMULGIN L, PROCOL LA-15 (from Protameen); BRIJ 35, BRIJ 56, BRIJ 76, BRIJ 78, BRIJ 97, BRIJ 98 (from Sigma Chemical Co.); NEODOL 25-12 and NEODOL 45-13 (from Shell); HETOXOL CA-10, HETOXOL CA-20, HETOXOL CS-9, HETOXOL CS-15, HETOXOL CS-20, HETOXOL CS-25, HETOXOL CS-30, PLURAFAC A38 and PLURAFAC LF700 (from BASF); ST-8303 (from Cognis); AROSURF 66 E10 and AROSURF 66 E20 (from Witco/Crompton); ethoxylated tallow (9.4 EO), propoxylated tallow (4.4 EO) and alkoxylated tallow (5-16 EO and 2-5 PO) (from Witco/Crompton). There may also be mentioned SURFONIC NP9S and SURFONIC LF-X from Huntsman Chemical Co. and the TERGITOL series from Dow.

In certain cases, one or more amidoalkylamine surfactants can be included to improve the stability of the composition containing the herbicide or the herbicide mixture.

It is possible in particular to use a non-ionic surfactant such as an ester of sugar and polyethoxylated fatty acid(s), in particular polyoxyethylene (20)sorbitan monolaurate (also denoted polysorbate 20 or Tween® 20).

A herbicide composition which can be used according to the invention can also comprise other conventional additives and excipients, such as, for example, antifoaming agents, preservatives, antimicrobial agents, anti-freezing agents, thickening agents, dyes and agents improving the solubility of the herbicides, agents facilitating the penetration and/or the spread or any other additive usual in the field of phytopharmaceutical products.

The composition comprising the herbicide benzyl alcohol which can be used according to the invention can be in different forms, preferably in the form of an aqueous solution or a concentrated solution or suspension, an oily dispersion or in the form of microcapsules, powder or pellets.

A suitable liquid vehicle can be selected, for example, from water and organic solvents. There may be mentioned, by way of example, mineral oils, aromatic solvents, paraffin oils; vegetable oils such as soybean, rapeseed, olive, castor, sunflower, coconut, maize, cotton seed, flaxseed, palm, groundnut, sesame oil etc. and their esters; the esters of monohydroxy alcohol or of di- or tri-hydroxylated alcohols or of polyalcohols having 4 to 6 hydroxy groups, such as 2-ethylhexyl stearate, n-butyl oleate, isopropyl myristate, propylene glycol dioleate, di-octyl succinate, di-butyl adipate, di-octyl phthalate etc.; mono-, di- and polycarboxylic acid esters; organic solvents such as toluene, xylene, acetone, methylethylketone, cyclohexanone, trichloroethylene, perchloroethylene, ethyl acetate, amyl acetate, butyl acetate, propylene glycol monomethyl ether, diethylene glycol monomethyl ether, methyl alcohol, ethyl alcohol, ethylene glycol, propylene glycol, glycerol, N-methyl-2-pyrrolidone, N,N-dimethyl alkylamides, dimethyl sulfoxide, etc.; or liquid fertilizers.

A herbicide composition which can be used according to the invention can be easily obtained by simple mixing (dispersion or solubilization) of the benzyl alcohol with the other components of the composition, in particular the co-herbicides and the other additives and surfactants mentioned previously. Moreover, the herbicide compositions which can be used according to the invention can contain pesticides other than herbicides, such as fungicides or insecticides, fertilizing agents and/or growth regulators.

A composition which can be used according to the invention can be in the form of wettable powders which are produced by uniform dispersion in water in the presence or absence of surfactants such as ionic or non-ionic surfactants, for example polyethoxylated alkylphenols, polyethoxylated fatty alcohols, or fatty amines, sulfonate alcohols, sulfonate alkylbenzenes, sodium lignosulfonate. The emulsifiable concentrates can be prepared by dissolving benzyl alcohol and, where necessary, the co-herbicide(s).

The emulsifiable concentrates can be prepared by dissolving the active principle in an organic solvent such as butanol, cyclohexanone, dimethylformamide, xylene or other aromatics or high boiling point hydrocarbons with the addition of one or more ionic or non-ionic surfactants (emulsifiers). As emulsifiers which can be used, there may be mentioned the alkylarylsulfonic acid calcium salts such as calcium sulfonate dodecylbenzene, or non-ionic emulsifiers such as fatty acid polyglycol esters, polyglycol ether alkyl aryls, fatty alcohol polyglycol ethers, polyglycol ethers, propylene oxide/ethylene oxide condensates, polyether alkyls, sorbitan fatty acid esters, sorbitan polyoxyethylene fatty acid esters or sorbitol polyoxyethylene esters.

DESCRIPTION OF THE PREFERRED EMBODIMENTS

Figure 1:
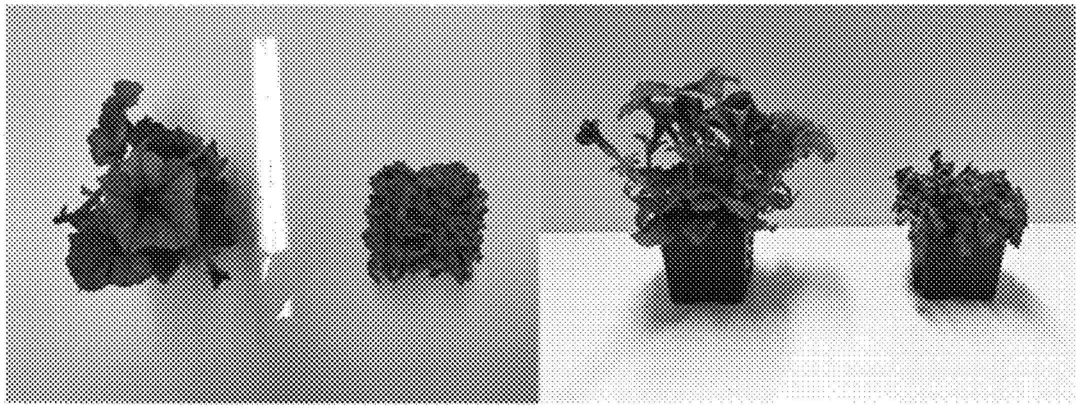
FIG. 1 illustrates the effect of benzyl alcohol in the case of foliar application to the pink *petunia* (Example 1).
Figure 2:
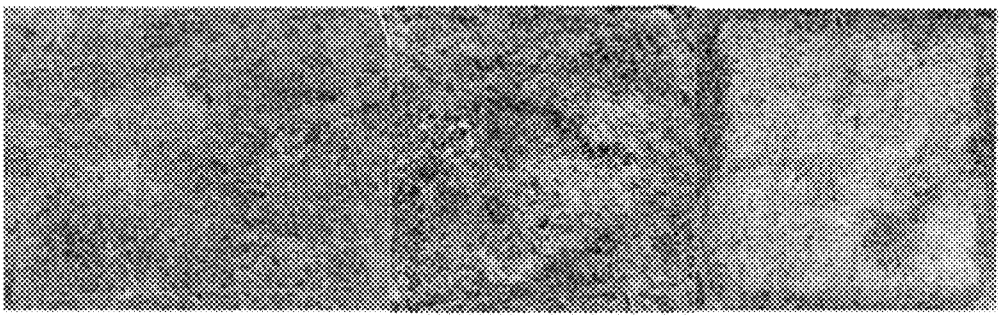
FIG. 2 illustrates the effect of benzyl alcohol outdoors (assay no. 3 in Example 5).
Figure 3:
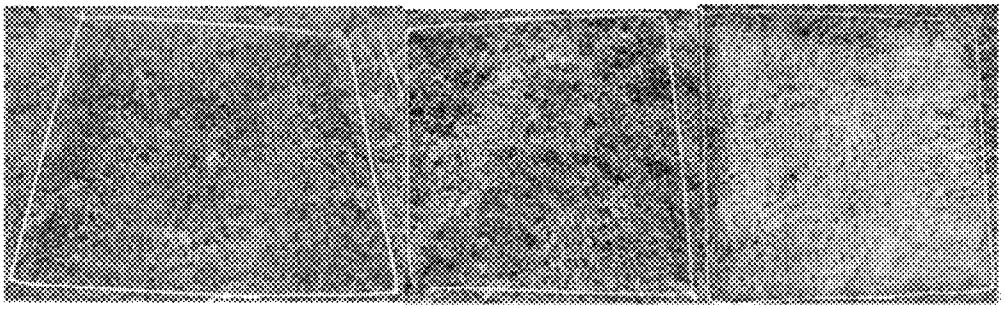
FIG. 3 illustrates the effect of benzyl alcohol outdoors (assay no. 4 in Example 5).

The invention is illustrated in a non-limitative manner by the following examples. In all the examples where the benzyl alcohol was diluted, this dilution was carried out with water.

Example 1: Foliar Application

Assays were carried out on different plants by foliar application (spraying) to evaluate the herbicide function, its foliar application mode and its speed of action.

1) Protocol

The assays were carried out on potted plants. The application of the product is carried out with a trigger spray bottle which makes it possible to spray 1 g of product per spraying as microdroplets.

The plants were sprinkled with different quantities of water containing different quantities of pure benzyl alcohol (PanReac AppliChem-ITW Reagents). The untreated (control) plants are sprinkled with the same total quantity, but of water only.

The plants were observed at the following times: T0, 6 h, 24 h, 48 h, 72 h, 96 h and 120 h.

The collapsing of the plant, the colour intensity of the plant and the diameter of the plant were measured in the following manner:

- Collapsing of the plant: the collapsing was evaluated on a scale of 1 to 5. A score of 5 corresponds to the state of the plant habit at T0 and 1 corresponds to a total collapsing of the plant.
- Colour intensity: the colour of the plant (leaves and flowers) is evaluated on a scale of 1 to 5. A score of 5 corresponds to the colour intensity of the plant at T0 and a score of 1 corresponds to a total discoloration of the plant (white or brown according to the type of plant).
- Diameter of the plant: the diameter of the plant corresponds to the surface area occupied by the plant seen from above and is evaluated by a score of 1 to 5. A score of 5 corresponds to the diameter of the plant at T0 and a score of 1 corresponds to the size of the pot (or smaller than this).

2) Results

The results are given in Table 1 below, which includes, for each plant, the time in which it passes from a score of 5 (T0) to a score of 1.

The quantities of water and benzyl alcohol are expressed in g and an equivalent quantity in L/Ha.

TABLE 1

| Plant | Total quantity of product: Water alone (control plant) or Water + benzyl alcohol (treated plant) | Benzyl alcohol (treated plant) | Collapsing of treated plant (score and time) | Colour intensity of treated plant (score and time) | Diameter of treated plant (score and time) |
|---|---|---|---|---|---|
| White petunia | 6 g (300 L/Ha) | 0.1 g (5 L/Ha) | 1 to 96 h | 1 to 96 h | 1 to 120 h |
| Pink petunia | 4 g (200 L/ha) | 0.4 g (20 L/ha) | 1 to 72 h | 1 to 48 h | 1 to 96 h |
| Purple horned pansy | 12 g (600 L/Ha) | 1 g (50 L/Ha) | 1 to 48 h | 1 to 24 h | 1 to 48 h |

TABLE 1-continued

| Plant | Total quantity of product: Water alone (control plant) or Water + benzyl alcohol (treated plant) | Benzyl alcohol (treated plant) | Collapsing of treated plant (score and time) | Colour intensity of treated plant (score and time) | Diameter of treated plant (score and time) |
|---|---|---|---|---|---|
| Dahlia | 20 g (1000 L/ha) | 2 g (100 L/Ha) | 1 to 48 h | 1 to 24 h | 1 to 72 h |
| Sage | 10 g (500 L/Ha) | 4 g (200 L/Ha) | 1 to 48 h | 1 to 24 h | 1 to 48 h |
| Lobelia | 6 g (300 L/ha) | 6 g (300 L/Ha) | 1 to 24 h | 1 to 24 h | 1 to 24 h |
| Carnation | 16 g (800 L/ha) | 8 g (400 L/Ha) | 1 to 24 h | 1 to 24 h | 1 to 48 h |
| White horned pansy | 12 g (600 L/Ha) | 12 g (600 L/Ha) | 1 to 6 h | 1 to 6 h | 1 to 6 h |
| Ivy | 20 g (1000 L/Ha) | 16 g (800 L/Ha) | 1 to 96 h | 1 to 48 h | 1 to 96 h |

3) Conclusion

The results show that benzyl alcohol used in foliar application shows a good effectiveness regardless of the quantity of water used. On contact with benzyl alcohol and over a few hours, the plants collapse, the plant loses rigidity then falls down.

The speed of action is dose-dependent for a given variety. The higher the concentration of active material, the quicker the result.

Example 2: Systemic Application Though Contact with the Above-Ground Parts

Assays were carried out on different plants by treatment on a fraction of the above-ground parts.

1) Protocol

The assays were carried out on potted plants.

The systemic action was evaluated on several types of plants by treatment on a fraction of its above-ground parts.

The application of the product is carried out with a trigger spray bottle which makes it possible to spray 1 g of product per spraying, as microdroplets.

The treated plants are sprinkled on only one half, with different quantities of water comprising different quantities of pure benzyl alcohol (PanReac AppliChem—ITW Reagents). The untreated (control) plants are sprinkled with the same total quantity, but of water only.

The plants are observed at the following times: T0, 6 h, 24 h, 48 h, 72 h, 96 h, 120 h, 144 h, 168 h.

The collapsing of the plant, the colour intensity and the diameter of the plant were measured as indicated in Example 1. The systemic effectiveness time was also measured in the following manner:

Systemic effectiveness time: 50% of the plant is initially treated with the product. The time necessary to see the first effects (systemically) appear on the part not treated (systemically) is determined.

2) Results

The results are given in Table 2 below, which includes, for each treated plant, the time in which it passes from a score of 5 (T0) to a score of 1.

The quantities of water and benzyl alcohol are expressed in g and an equivalent quantity in L/Ha.

For the treated plants, the results are indicated as follows: systemic effectiveness time (column A), collapsing (column B), colour intensity (column C), diameter (column D).

TABLE 2

| Plant | Total quantity of product: Water alone (control plant) or Water + benzyl alcohol (treated plant) | Benzyl alcohol (treated plant) | A | B (score and time) | C (score and time) | D (score and time) |
|---|---|---|---|---|---|---|
| Horned pansy | 12 g (600 L/Ha) | 0.1 g (5 L/Ha) | whole plant affected at 120 h | 1 to 168 h | 1 to 144 h | 1 to 168 h |
| Hypoestes | 8 g (400 L/Ha) | 1 g (50 L/Ha) | whole plant affected at 96 h | 1 to 120 h | 1 to 120 h | 1 to 144 h |
| Osteospermum | 2 g (100 L/Ha) | 2 g (100 L/Ha) | whole plant affected at 96 h | 1 to 144 h | 1 to 120 h | 1 to 144 h |
| Carnation | 4 g (200 L/Ha) | 4 g (200 L/Ha) | whole plant affected at 72 h | 1 to 86 h | 1 to 96 h | 1 to 120 h |
| White petunia | 16 g (800 L/Ha) | 10 g (500 L/Ha) | whole plant affected at 24 h | 1 to 48 h | 1 to 48 h | 1 to 48 h |

TABLE 2-continued

| Plant | Total quantity of product: Water alone (control plant) or Water + benzyl alcohol (treated plant) | Benzyl alcohol (treated plant) | A | B (score and time) | C (score and time) | D (score and time) |
|---|---|---|---|---|---|---|
| Grass | 20 g (1000 L/Ha) | 16 g (800 L/Ha) | whole plant affected at 96 h | 1 to 144 h | 1 to 120 h | 1 to 168 h |

3) Conclusion

Foliar application of benzyl alcohol on only a part of the plant shows a rapid effectiveness over the whole plant. The generalized impact on the plant within 3 to 5 days demonstrates a systemic effect. The benzyl alcohol circulates in the conductive tissues and affects all of the plant.

Example 3: Systemic Action Through Contact with the Underground Parts

1) Protocol

The assays were carried out on potted plants.

Pure benzyl alcohol was used (PanReac AppliChem—ITW Reagents).

Two potted plants (Horned pansy) were each placed in a saucer containing respectively 40 g pure benzyl alcohol or 40 g water (control). By capillary action, the liquids contained in the saucer are absorbed by the earth and come into contact with the roots.

The plants are observed at 0, 24 h, 48 h, 72 h, 96 h, 120 h, 144 h and 168 h. The systemic effectiveness time, the collapsing of the plant, the colour intensity and the diameter of the plant were measured as indicated in Examples 1 and 2.

2) Results

For the plant the saucer of which contains 40 g pure benzyl alcohol, the following results are observed:

Systemic effectiveness time: the whole plant is affected in 48 h.

Collapsing: the plant passes from a score of 5 to a score of 1 in 72 h.

Colour intensity: the plant passes from a score of 5 to a score of 1 in 48 h.

Diameter of the plant: the plant passes from a score of 5 to a score of 1 in 96 h.

These results corroborate the results obtained by sprinkling when half of the plant is treated and confirms the systemic action of the herbicide benzyl alcohol. In fact, it is the take up of the active product by the root system and its distribution to all of the plant which make it possible to produce an effect on the foliar system.

Example 4: Non-Selective Activity 4.1) Herbaceous Plants

The non-selective character of benzyl alcohol was studied on 3 common varieties of herbaceous plants, two dicotyledons (dandelions and clover) and a monocotyledon (grass).

The dandelion is a herbaceous plant composed of a rosette of leaves. Its seeds, which are blown by the wind, disperse this plant all over, making it a weed that is particularly present in gardens.

Clover is a particularly robust species. This plant develops creeping rhizomes allowing it to spread quite quickly and to be able to survive after a loss of its leaves, making this plant a good model for testing the systemic effect of a herbicide.

The grass of the ryegrass type makes it possible to confirm that the spectrum of action of benzyl alcohol is broad.

a) Protocol

The assays were carried out on potted plants. The application of the product is carried out with a trigger spray bottle which makes it possible to spray 1 g of product per spraying, as microdroplets.

The treated plants are sprinkled with different quantities of water comprising different quantities of pure benzyl alcohol (PanReac AppliChem—ITW Reagents). The untreated (control) plants are sprinkled with the same total quantity of water only.

The plants are observed at the following times: T0, 6 h, 24 h, 48 h, 72 h, 96 h. The collapsing of the plant, the colour intensity and the diameter of the plant were measured as indicated in Example 1.

b) Results

The results are given in Table 3 below, which includes, for each plant, the time in which it passes from a score of 5 (T0) to a score of 1.

The quantities of water and benzyl alcohol are expressed in g and an equivalent quantity in L/Ha.

TABLE 3

| Plant | Total quantity of product: Water alone (control plant) or Water + benzyl alcohol (treated plant) | Benzyl alcohol (treated plant) | Collapsing (score and time) | Colour intensity (score and time) | Diameter (score and time) |
|---|---|---|---|---|---|
| Dandelion | 8 g (400 L/Ha) | 4 g (200 L/Ha) | 1 to 48 h | 1 to 24 h | 1 to 48 h |
| Clover | 8 g (400 L/Ha) | 4 g (200 L/Ha) | 1 to 48 h | 1 to 24 h | 1 to 48 h |
| Grass | 8 g (400 L/Ha) | 4 g (200 L/Ha) | 1 to 48 h | 1 to 24 h | 1 to 48 h |

4.2) Brambles

Brambles are very invasive plants in ditches and on railway embankments. They are perennial plants, which also have powerful roots and thorns, which make them difficult to pull up.

a) Protocol

The assays were carried out on potted plants.

The application of the product is carried out with a trigger spray bottle which makes it possible to spray 1 g of product per spraying, as microdroplets. The treated plants are sprinkled with different quantities of water comprising different quantities of pure benzyl alcohol (PanReac AppliChem—ITW Reagents). The untreated (control) plants are sprinkled with the same total quantity of water only.

The brambles are sprinkled with:

- 16 g of product (equivalent to 800 L/Ha) including 12 g pure benzyl alcohol for the treated plant (equivalent to 600 L/Ha pure benzyl alcohol), and
- 16 g water for the control plants.

The plants are observed at the following times: T0, 6 h, 24 h, 48 h, 72 h, 96 h, 120 h and 144 h. The collapsing of the plant, the colour intensity and the diameter of the plant were measured as indicated in Example 1.

b) Results

- Collapsing: The plant passes from a score of 5 to a score of 1 in 144 h.
- Colour intensity: The plant passes from a score of 5 to a score of 1 in 96 h. The control plants do not show any difference before and after treatment.

4.3) Conclusion

The non-selective herbicide activity of benzyl alcohol allows its use in cultivated or uncultivated areas (agricultural, non-agricultural, railways, etc.) which have very heterogeneous plant varieties.

Example 5: Outdoor Assays with Benzyl Alcohol Used Alone

1) Assay No. 1:

1.1) Protocol

The outdoor assays were carried out on squares of grass having a surface area of 1 $m^2$. The application of the product is carried out with a compression sprayer which makes it possible to spray 20 to 100 g liquid over a surface area of 1 $m^2$ (equivalent to 200-1000 L/Ha).

The treated squares of grass are sprayed with a total quantity of water and pure benzyl alcohol (PanReac AppliChem—ITW Reagents) of 20 g (equivalent 200 l/Ha) including 0.5 g benzyl alcohol (equivalent to 5 L/Ha pure benzyl alcohol). The control squares of grass receive a total quantity of 20 g water alone.

The squares of grass are observed at the following times T0, 6 h, 24 h, 48 h, 72 h, 96 h, 120 h, 144 h, 168 h.

The following measurements and evaluations were carried out:

- Percentage of the surface area affected: Following the assays in pots, it was noted that the change in colour correlated with the collapsing and the death of the plants. The time necessary to impact the colour of the grass as well as its surface area was evaluated.
- Measurement of the collapsing of the grass: the distance between the ground and the highest part of 10 blades of grass selected at random in a square is measured. The average of these 10 blades is calculated and, after treatment, when this average distance is reduced by 30%, the collapsing time is determined.

1.2) Results

- Percentage of the surface area affected: A maximum percentage of the surface area affected of 45% is observed 96 h after treatment.
- Collapsing of the grass: 72 h after treatment, the grass has a 2) Assay No. 2

2.1) Protocol

Assay no. 2 was carried out under the same conditions as assay no. 1, except that the treated squares of grass are sprayed with a total quantity of water and benzyl alcohol of 60 g (equivalent 600 L/Ha) including 5 g pure benzyl alcohol (equivalent to 50 L/Ha pure benzyl alcohol).

The control squares of grass receive a total quantity of 60 g water alone.

The percentage of the surface area affected and the collapsing of the grass were evaluated as indicated above.

2.2) Results

- Percentage of the surface area affected: A maximum percentage of the surface area affected of 60% is observed 72 h after treatment.
- Collapsing of the grass: 48 h after treatment, the grass has an average collapsing of 30%.

3) Assay No. 3

3.1) Protocol

Assay no. 3 was carried out under the same conditions as assay no. 1, except that the treated squares of grass are sprayed with a total quantity of 20 g pure benzyl alcohol (equivalent to 200 L/Ha pure benzyl alcohol).

The control squares of grass receive a total quantity of 20 g water alone.

The percentage of the surface area affected and the collapsing of the grass were evaluated as indicated above.

3.2) Results

- Percentage of the surface area affected: A maximum percentage of the surface area affected of 80% is observed 48 h after treatment.
- Collapsing of the grass: 48 h after treatment, the grass has an average collapsing of 30%.

4) Assay No. 4

4.1) Protocol

Assay no. 4 was carried out under the same conditions as assay no. 1, except that the treated squares of grass are sprayed with a total quantity of water and benzyl alcohol of 60 g (equivalent 600 L/Ha) including 40 g pure benzyl alcohol (equivalent to 400 L/Ha pure benzyl alcohol).

The control squares of grass receive a total quantity of 60 g water alone.

The percentage of the surface area affected and the collapsing of the grass were evaluated as indicated above.

4.2) Results

- Percentage of the surface area affected: A maximum percentage of the surface area affected of 100% is observed 24 h after treatment.
- Collapsing of the grass: 24 h after treatment, the grass has an average collapsing of 30%.

5) Assay No. 5

5.1) Protocol

Assay no. 5 was carried out under the same conditions as assay no. 1, except that the treated squares of grass are sprayed with a total quantity of water and benzyl alcohol of 100 g (equivalent 1000 L/Ha) including 60 g pure benzyl alcohol (equivalent to 600 L/Ha pure benzyl alcohol).

The control squares of grass receive a total quantity of 100 g water alone.

The percentage of the surface area affected and the collapsing of the grass were evaluated as indicated in Example 4.

5.2) Results

Percentage of the surface area affected: A maximum percentage of the surface area affected of 100% is observed 24 h after treatment.

Collapsing of the grass: 6 h after treatment, the grass has an average collapsing of 30%.

6) Assay No. 6

6.1) Protocol

Assay no. 6 was carried out under the same conditions as assay no. 1, except that the treated squares of grass are sprayed with a total quantity of 80 g pure benzyl alcohol (equivalent to 800 L/Ha pure benzyl alcohol).

The control squares of grass receive a total quantity of 80 g water alone.

The percentage of the surface area affected and the collapsing of the grass were evaluated as indicated in Example 4.

6.2) Results

Percentage of the surface area affected: A maximum percentage of the surface area affected of 100% is observed 6 h after treatment.

Collapsing of the grass: 6 h after treatment, the grass has an average collapsing of 30%.

Example 6: Outdoor Assays with Benzyl Alcohol Used in Combination

Assay No. 1: Benzyl Alcohol and Pelargonic Acid 1.1) Protocol

Outdoor assays were carried out on squares of grass having a surface area of 1 $m^2$. Pure benzyl alcohol (PanReac AppliChem—ITW Reagents) and commercially available pelargonic acid were used, composed of 24.3% pelargonic acid (Path and patio weedkiller—BHS—Naturnet).

The application of the product is carried out with a compression sprayer which makes it possible to spray 20 to 100 g liquid over a surface area of 1 $m^2$ (equivalent to 200-1000 L/Ha).

The treated squares of grass are sprayed with a total quantity of water, benzyl alcohol and pelargonic acid of 40 g (equivalent to 400 L/Ha) including 20 g benzyl alcohol (equivalent to 200 L/Ha pure benzyl alcohol) and 1 g pelargonic acid (equivalent to 2.43 L/Ha pure pelargonic acid).

The control squares of grass receive a total quantity of 40 g water alone.

The squares of grass are observed at the following times T0, 6 h, 24 h, 48 h, 72 h, 96 h, 120 h, 144 h, 168 h.

The percentage of the surface area affected and the collapsing of the grass were evaluated as indicated in Example 5.

1.2) Results

Percentage of the surface area affected: A maximum percentage of the surface area affected of 100% is observed 48 h after treatment.

Collapsing of the grass: 24 h after treatment, the grass has an average collapsing of 30%.

The results show that the combination of benzyl alcohol with pelargonic acid, on the one hand, makes it possible to obtain a quicker effect (duration reduced by half) and, on the other hand, allows a more extensive effect due to the systemic effect of the benzyl alcohol, compared with pelargonic acid alone.

The combination of the two molecules make it possible in particular to:

reduce the respective quantities of the two molecules;

reduce the action time;

reduce the product costs.

Assay No. 2: Benzyl Alcohol and White Vinegar 2.1) Protocol

Outdoor assays were carried out on squares of grass having a surface area of 1 $m^2$. Pure benzyl alcohol (PanReac AppliChem—ITW Reagents) and commercially available white vinegar were used.

The assays and activity measurements are carried out as described in assay no. 1 above, except that the treated squares of grass are sprayed with a total quantity of water, benzyl alcohol and white vinegar of 40 g (equivalent to 400 L/Ha) including 20 g benzyl alcohol (equivalent to 200 L/Ha pure benzyl alcohol) and 1 g white vinegar (equivalent to 10 L/Ha vinegar).

The control squares of grass receive a total quantity of 40 g water alone.

2.2) Results

Percentage of the surface area affected: A maximum percentage of the surface area affected of 90% is observed 48 h after treatment.

Collapsing of the grass: 48 h after treatment, the grass has an average collapsing of 30%.

The results show that the combination of benzyl alcohol with vinegar, on the one hand, makes it possible to obtain a quicker effect (duration reduced by half) and, on the other hand, allows a more extensive effect due to the systemic effect of the benzyl alcohol, compared with the vinegar alone.

The combination of the two molecules makes it possible in particular to:

reduce the respective quantities of the two molecules;

reduce the action time;

reduce the product costs.

Assay No. 3: Benzyl Alcohol and Salt (Sodium Chloride)

3.1) Protocol

Outdoor assays were carried out on squares of grass having a surface area of 1 $m^2$. 100% benzyl alcohol (PanReac AppliChem—ITW Reagents) and commercially available salt were used.

The assays and activity measurements are carried out as described in assay no. 1 above, except that the treated squares of grass are sprayed with a total quantity of water, benzyl alcohol and white vinegar of 40 g (equivalent to 400 L/Ha) including 20 g pure benzyl alcohol (equivalent to 200 L/Ha pure benzyl alcohol) and 1 g salt (equivalent to 10 g/Ha salt).

The control squares of grass receive a total quantity of 40 g water alone.

3.2) Results

Percentage of the surface area affected: A maximum percentage of the surface area affected of 87% is observed 48 h after treatment.

Collapsing of the grass: 48 h after treatment, the grass has an average collapsing of 30%.

Example 7: Preventative Activity (Anti-Germination)

1) Protocol

The assays were carried out on seeds sown on a Petri dish with respectively a control mode, an assay with benzyl alcohol and an assay with glyphosate herbicide (Gallup® super 360, Barclay).

The application of the product is carried out with a trigger spray bottle which makes it possible to spray 0.35 g of product per spraying, as microdroplets. Seeds are placed on an agar gel in Petri dishes. 16 barley seeds, 24 rapeseed seeds, 18 wheat seeds, 10 maize seeds, 10 soybean seeds are positioned for each test.

The seeds are sprinkled either with 0.35 g water (equivalent 700 L/Ha) including 0.35 g pure benzyl alcohol (PanReac AppliChem—ITW Reagents) (equivalent 700 L/Ha pure benzyl alcohol), or with 0.35 g water for the control, or with 0.35 g glyphosate diluted at 0.5% for the glyphosate test.

The plants are observed at 0 and 11 days. The percentage of germination is the percentage of germinated seeds evaluated after 11 days.

2) Results

The percentage of germination at 11 days is reported in Table 4 below.

TABLE 4

| Plant (seed) | Benzyl alcohol | Glyphosate | Control |
|---|---|---|---|
| Barley | 0 | 100% | 100% |
| Rapeseed | 0 | 100% | 100% |
| Wheat | 0 | 100% | 100% |
| Dandelion | 0 | 83% | 82% |
| Maize | 0 | 100% | 100% |
| Soybean | 0 | 100% | 100% |

The results show that, 11 days after seeding, regardless of the plant family of the treated seed, only the seeds treated with benzyl alcohol did not germinate, whereas the untreated seeds or seeds treated with glyphosate did germinate.

The seeds tested belong to different families which belong to both the monocotyledon plants and to the dicotyledon plants.

The results show that benzyl alcohol blocks the germination of the seeds or kills them.

Example 8: Pre-Emergence Herbicide Activity

Pre-emergence herbicides are generally applied a short time after seeding, but before the emergence of the first plantlets of the cultivated plant. They are not mechanically incorporated in the soil. The mechanism of action is based on the fact that the weeds, including grass, originate in general from the upper layers of the soil (<50 mm). The cultivated plants are seeded at a greater depth. The herbicide applied to the upper layer of the soil must be washed by a light sprinkling.

The spatial separation of the herbicide effect confined to the upper layers of the soil from the germination of the crops in the lower layers increases the safety. Application early in the crop cycle makes it possible to reduce competition in favour of the cultivated plant.

1) Protocol

The assays were carried out on potted plants.

Pure benzyl alcohol was used (PanReac AppliChem—ITW Reagents). The application of the product is carried out with a trigger spray bottle which makes it possible to spray 1 g of product per spraying as microdroplets.

Barley seeds (50 seeds per condition) are sown in potting soil at different depths (1, 2 and 3 cm). Then, 100% benzyl alcohol is sprayed on the earth (above the seeds) at different concentrations (10, 25, 50, 100, 200, 300 L/Ha). The state of germination is observed at 0 and 11 days. The percentage of germination is the percentage of germinated seeds evaluated after 11 days.

The percentage of seeds germinated under each of the conditions is determined and if it is below 70%, pre-emergence use is not recommended.

2) Results

The results are given in Table 5 below.

The note "yes" indicates that pre-emergence use is prescribed. The note "no" indicates that pre-emergence use is not recommended.

TABLE 5

| | Quantity of benzyl alcohol | | |
|---|---|---|---|
| Seeding depth | Less than 50 L/Ha | 50 L/Ha | 100 L/Ha |
| 1 cm | yes | yes | no |
| 2 cm | yes | yes | yes |
| 3 cm | yes | yes | yes |

The results show that pre-emergence use is possible with a concentration that can be adjusted depending on the seeding depth.

Example 9: Preventative Herbicide Activity by Sprinkling of the Soil

Use by sprinkling makes it possible to meet the conditions imposed by the ECOPHYTO plan which consists of reducing the quantities of phytosanitary products.

It also has the advantage of being used preventatively on areas known for the growth of certain adventive plants.

Areas identified as each year showing the presence of couch grass, grass, bindweeds and thistles were treated preventatively. The area to be treated was divided into 5 parts in order to test different dosages of active material (pure benzyl alcohol), namely 50, 70, 110, 120 and 130 L/Ha.

The results are reported in Table 6 below, in which the note "yes" indicates the areas where the plants have sprouted despite the preventative treatment, and the note "no" indicates the areas where the preventative treatment made it possible to prevent the sprouting of the identified plants.

TABLE 6

| Plant | 50 L/ha | 70 L/Ha | 110 L/Ha | 120 L/Ha | 130 L/Ha | 150 L/Ha |
|---|---|---|---|---|---|---|
| Couch grass | yes | yes | yes | yes | no | no |
| Grass | yes | yes | yes | no | no | no |
| Bindweed | yes | yes | no | no | no | no |
| Thistle | yes | yes | no | no | no | no |

Usual foliar application for this type of plant generally being 300 L/Ha, a reduction of the quantity of herbicide is observed by species, as indicated in Table 7 below

TABLE 7

| Plant | Usual quantity of herbicide (foliar) | Quantity of benzyl alcohol (sprinkling) | % reduction compared with a usual herbicide |
|---|---|---|---|
| Couch grass | 300 L/Ha | 130 L/Ha | 56.7% |
| Grass | 300 L/Ha | 120 L/Ha | 60% |
| Bindweed | 300 L/Ha | 110 L/Ha | 63.4% |
| Thistle | 300 L/Ha | 110 L/Ha | 63.4% |

The results show that application by sprinkling makes it possible to divide the quantity of product used by 2 on average.

In addition, the waiting period before the next seeding will be reduced by an average of 30%.

Example 10: Intercrop Herbicide Activity

1) Protocol

Pure benzyl alcohol was used (PanReac AppliChem—ITW Reagents).

Barley and rapeseed seeds are sown in potting soil 1, 2, 3, 5, 6, 10, 13, 15, 20 days after treatment of the potting soil with pure benzyl alcohol in different concentrations (10 L/Ha, 50 L/Ha, 100 L/Ha, 200 L/Ha, 300 L/Ha, 400 L/Ha, 500 L/Ha, 600 L/Ha). The seeding period is then determined when 70% of the seeds sown germinate.

The plants are observed at T0, 24 h, 48 h, 72 h, 96 h, 120 h, 144 h and 168 h.

2) Results

The results showing the seeding period depending on the dose used are reported in Table 8 below.

TABLE 8

| | Dose used | | | | |
|---|---|---|---|---|---|
| | Less than 100 L/Ha | 100/LHa | 200 L/Ha | 300 L/Ha | More than 300 L/Ha |
| Days of waiting before seeding | 5 | 5 | 7 | 15 | 15 |

The results show that it is possible to adjust the seeding period depending on the dose of herbicide used.

Example 11: Inter-Row Cultivation Herbicide Activity

Certain crops, such as vines or market gardening, require inter-row treatment. The possible migrations of the active molecule above-ground or through the ground are liable to affect the adjacent crops were tested.

1) Protocol

Pure benzyl alcohol was used (PanReac AppliChem—ITW Reagents).

Two plants (*Petunia*) were planted with a spacing of 20 cm. Only one of the plants is treated, either in a foliar manner or by sprinkling in different concentrations (10 L/Ha, 20 L/Ha, 50 L/Ha, 100 L/Ha, 200 L/Ha, 300 L/Ha, 40 L/Ha, 500 L/Ha, 600 L/Ha). The plants are observed at 0, 24 h, 48 h, 72 h, 96 h, 120 h, 144 h and 168 h.

The use of herbicide will be possible when the untreated plant does not collapse.

2) Results

The results are reported in Table 9 below, in which the note "yes" indicates the dose and the mode of use when use in intercrop cultivation is prescribed, and the note "no" indicates that it is not.

TABLE 9

| | | Quantity of product used | | | |
|---|---|---|---|---|---|
| | | Less than 50 L/Ha | 50 L/Ha | 100 L/Ha | 200 L/Ha |
| Inter-row | Sprinkling | yes | yes | yes | no |
| use | Foliar | no | no | no | no |

The results show that sprinkling makes it possible to adjust the quantity of product that can be used in inter-row cultivation.

Example 12: Herbicide Activity in Synergy with Other Herbicides (Molecular Synthesis Inhibitors)

Protocol

Outdoor assays were carried out on squares of grass having a surface area of 1 $m^2$. Pure benzyl alcohol (PanReac AppliChem—ITW Reagents) and co-herbicides were used in the concentrations indicated below.

The assays and activity measurements are carried out as described in assay no. 1 in Example 5, except that the treated squares of grass are sprayed with a total quantity of water, benzyl alcohol and co-herbicide of 40 g (equivalent to 400 L/Ha) including 20 g benzyl alcohol (equivalent to 200 L/Ha pure benzyl alcohol).

The control squares of grass receive a total quantity of 40 g water alone.

The synergy assays were carried out with the following herbicides:

1. diflufenicanil, a PDS inhibitor (Carat® from Bayer, 1 l/ha),
2. tembotrione, a 4-HPPD inhibitor (Auxo® from Bayer, 1.5 l/ha),
3. aclonifen, a DOXP synthesis inhibitor (Challenge®, 2.5 l/ha);
4. glyphosate, a shikimic acid pathway inhibitor (Gallup® Super 360, Barclay, 3 to 8 l/ha);
5. benzoic acid (Banvel 4S® from Syngenta, 0.6 l/ha)
6. cellular division inhibitors (Antilope® from Bayer, 0.6 l/ha and DualGold® from Syngenta, 1.5 to 2 l/ha);
7. sulfonylureas, an ALS inhibitor (Adret® from Bayer, 1 l/ha)
8. a lipid synthesis inhibitor (ACCase) (Tramat® from Bayer—1 l/ha)
9. phenmedipham, a photosynthesis PS II inhibitor (Betanal® Booster from Bayer, 1 l/ha).

All the assays were carried out on the basis of 50% of the recommended dose. The results are reported in Table 10 below.

TABLE 10

| | Product tested | | | | | | | | |
|---|---|---|---|---|---|---|---|---|---|
| | 1 | 2 | 3 | 4 | 5 | 6 | 7 | 8 | 9 |
| % effectiveness in 1 day | — | — | — | 40% | 50% | 50% | — | — | — |
| % effectiveness in 2 days | — | 20% | 35% | 60% | 80% | 60% | 50% | 30% | 20% |
| % effectiveness in 3 days | 80% | 50% | 60% | 100% | 100% | 100% | 80% | 50% | 40% |
| % effectiveness in 4 days | 100% | 100% | 100% | 100% | 100% | 100% | 100% | 80% | 100% |

The results show that, when the molecular synthesis inhibitors tested are combined with benzyl alcohol, a good and early herbicide activity is obtained in a period of days, which is the case with benzyl alcohol, and not of weeks, as is the case when the herbicides tested are used alone.

Example 13: Systemic Action Though Contact with the Leaves

1) Protocol

*Chenopodium album* (CHEAL) seeds are sown in Petri dishes in vermiculite moistened with a 0.2% solution of $KNO_3$. The dishes are incubated in a climatic chamber at 15° C./20° C. night/day and 14 h photoperiod up to the stage of emergence of the cotyledons. The plantlets are then transplanted, at a rate of 6 plants per pot and 5 pots in each of the groups (treated group and control group), in a mixture of agricultural earth:vermiculite (50:50).

The plantlets are cultivated under the same environmental conditions as previously up to the stage BBCH12-14.

1.1) Treatment

The plants are treated with benzyl alcohol at the stage BBCH12-14 with a dose of 20 L/ha benzyl alcohol with 660 g/l water, i.e. 13.2 kg benzyl alcohol/ha.

The product is applied in a volume corresponding to 300 L/ha using a spraying bench equipped with agricultural nozzles (Turbo Teejet TTII0015).

After treatment, the plants are returned to cultivation in a climatic chamber at 15° C./20° C. night/day and 14 h photoperiod.

A control group is not treated and only receives water.

1.2) Tagging Protocol

The following operations are carried out:

a) representative selection of at least 2 plantlets over 2 different pots;
b) recovery of root fragments;
c) transverse sections in the centre of an entirely developed leaf of each plantlet;
d) incubation of the root fragments and leaf sections with a fluorochrome revealing metabolic activity (green fluorescence).

2) Results

Electron microscopy observations were carried out by epifluorescence microscopy on the leaves and the roots of the treated plants and the control plants, 24 h and 7 days after treatment on the leaves.

In 24 h, certain treated plants show symptoms of drying ranging from a few spots to a total wilting of the leaf and other plants do not show any visual symptoms. On the epifluorescence microscopy images, on the sections of leaf a large decrease in the green colour is observed, which shows a strong reduction of the metabolic activity of the leaves of the treated plants compared with the control plants, whether or not they have visible symptoms on the leaves. On the root fragments, a slight decrease in the metabolic activity of the roots of the treated plants is observed compared with those of the control plants, even though the treated plants show visible symptoms or not.

7 days after treatment, some of the treated plants show symptoms of drying similar to those observed at 24 h and other plants do not show them.

Microscopic observations confirm the decrease in the metabolic activity of the roots of the treated plants compared with the control plants (reduction of the green colour). The reduction of the metabolic activity of the leaves of the treated plants increases over time, and this is the case whether or not the plants have visible symptoms.

The results observed on the epifluorescence microscopy images are reported in Tables 11 and 12 below, in which a mark of 0 to 5 is attributed depending on the intensity and the surface area of the fluorescence observed, where 0=no metabolic activity, and 5=complete metabolic activity.

Before uprooting and epifluorescence microscopy analysis, the treated plants were divided into 2 groups:

Group 1: plants not showing or showing few symptoms of drying on the treated area (leaf)

Group 2: plants having a dry leaf on the treated area (leaf)

The 2 groups are compared with the control group (untreated).

TABLE 11

| Metabolic activity on the roots | | | |
|---|---|---|---|
| | Control group | Group 1 | Group 2 |
| 24 h | 5 | 2 | 2.5 |
| 7 days | 5 | 1.5 | 2 |

The results show a reduction of the metabolic activity at the level of the roots in the treated plants, from 24 h after treatment.

TABLE 12

| Metabolic activity on the leaves | | | |
|---|---|---|---|
| | Control group | Group 1 | Group 2 |
| 24 h | 5 | 1 | 1 |
| 7 days | 5 | 0.5 | 0 |

The results show a strong reduction of the metabolic activity at the level of the leaves in the treated plants, from 24 h after treatment.

3) Conclusion

The results show that benzyl alcohol used as a herbicide at a rate of 20 L/Ha causes an overall decrease of the metabolic activity of the treated plants in 24 h, which is still visible 7 days after treatment.

The effect observed on the roots after treatment by spraying on the leaves shows that benzyl alcohol is systemic. In fact, benzyl alcohol diffuses to all of the plant through its distribution organs with an effect on organs remote from the contact area of the product, sometimes even before the effects are visible on the contact area.

Example 14: Early Post-Emergence Herbicide Activity, with Benzyl Alcohol Used Alone or in Combination Protocol The soil is composed of 50% agricultural soil and 50% vermiculite.

Mustard seeds are sown in a Petri dish up to the stage of emergence of the radicle. The pre-germinated seeds are placed 1 cm deep in 8 cm×8 cm pots at a rate of 5 seeds per pot and 5 pots/repetitions per condition (treated plants and control plants).

On appearance of the cotyledons, the treatment is applied using a spraying bench simulating an outdoor treatment.

The plants are treated with benzyl alcohol, alone or in combination, with 3 doses of active material (30 L/ha, 40 L/ha and 60 L/ha), respectively diluted in 200 L water. The spraying volume of 200 L/ha.

An untreated control (water alone) is added.

The cultivation conditions are 15° C. during the night/20° C. during the day with a photoperiod of 14 hours (light intensity of approximately 300 μmol/s/$m^2$).

A visual rating of the symptoms at 1, 3 and 7 days after treatment is carried out for the treated plants. The value 0 corresponds to a visual rating of a plant similar to the control and the value of 100 corresponds to the dead plant.

Each value is an average value calculated over 5 pots per condition.

Assay No. 1: Benzyl Alcohol Alone

The results are given in Table 13 below.

TABLE 13

| Dose (L/ha) | 1 day after treatment | 3 days after treatment | 7 days after treatment |
|---|---|---|---|
| 0 (control) | 0 | 0 | 0 |
| 30 | 3 | 21 | 81 |
| 40 | 59 | 82 | 93 |
| 60 | 63 | 92 | 100 |

Assay No. 2: Benzyl Alcohol and Sodium Benzoate

Sodium benzoate is used at a rate of 1.5% by weight relative to the total weight of active material (benzyl alcohol+sodium benzoate).

The results are given in Table 14 below.

TABLE 14

| Dose (L/ha) | 1 day after treatment | 3 days after treatment | 7 days after treatment |
|---|---|---|---|
| 0 (control) | 0 | 0 | 0 |
| 30 | 4 | 25 | 37 |
| 40 | 49 | 82 | 93 |
| 60 | 63 | 99 | 100 |

The results show a quicker herbicide activity (reduction of the action time) in comparison with benzyl alcohol used alone.

Assay No. 3: Benzyl Alcohol and Salicylic Acid

The results are given in Table 15 below.

Salicylic acid is used at a rate of 3% by weight relative to the total weight of active material (benzyl alcohol+salicylic acid).

TABLE 15

| Dose (L/ha) | 1 day after treatment | 3 days after treatment | 7 days after treatment |
|---|---|---|---|
| 0 (control) | 0 | 0 | 0 |
| 30 | 24 | 34 | 67 |
| 40 | 63 | 78 | 100 |
| 60 | 73 | 100 | 100 |

The results show that, under the tested conditions, the combination of benzyl alcohol and salicylic acid makes it possible to obtain a herbicide effect greater than that of benzyl alcohol alone, in particular 7 days after treatment, with a dose of 40 L/ha (death of the plants).

Assay No. 4: Benzyl Alcohol and Lysozyme

Lysozyme is used at a rate of 0.15% by weight relative to the total weight of active material (benzyl alcohol+lysozyme).

The results are given in Table 16 below.

TABLE 16

| Dose (L/ha) | 1 day after treatment | 3 days after treatment | 7 days after treatment |
|---|---|---|---|
| 0 (control) | 0 | 0 | 0 |
| 30 | 13 | 25 | 47 |
| 40 | 49 | 79 | 89 |
| 60 | 61 | 93 | 100 |

The results show that, under the tested conditions, the combination of benzyl alcohol and lysozyme makes it possible to obtain a herbicide effect greater than that of benzyl alcohol alone, in particular 3 days after treatment, with a dose of 60 L/ha.

Assay No. 5: Benzyl Alcohol and Phenethyl Alcohol

Phenethyl alcohol is used at a rate of 3% by weight relative to the total weight of active material (benzyl alcohol+phenethyl alcohol).

The results are given in Table 17 below.

TABLE 17

| Dose (L/ha) | 1 day after treatment | 3 days after treatment | 7 days after treatment |
|---|---|---|---|
| 0 (control) | 0 | 0 | 0 |
| 30 | 28 | 36 | 69 |
| 40 | 65 | 100 | 100 |
| 60 | 75 | 100 | 100 |

The results show that, under the tested conditions, the combination of benzyl alcohol and lysozyme makes it possible to obtain a herbicide effect greater than that of benzyl alcohol alone, in particular 3 days after treatment, with doses of 40 L/ha and 60 L/ha (death of the plants).

The invention claimed is:

1. A method for controlling noxious or undesirable plants, which comprises the application of a composition comprising benzyl alcohol as a herbicide to soil of crop areas, in which benzyl alcohol is the only active substance in the composition, which is applied at a rate of 5 L/hectare to 800 L/hectare.

2. The method of claim 1, wherein the benzyl alcohol as a herbicide exhibits herbicidal activity in which the herbicidal activity is non-selective.

3. The method of claim 2, in which the herbicide activity is carried out through penetration via underground parts of the plant.

4. The method of claim 1, in which the noxious or undesirable plants are selected from all of the plants of the green lineage or Archaeplastida.

5. The method of claim 1, in which benzyl alcohol is used at a rate of 5 L/hectare to 100 L/hectare.

6. The method of claim 1, in which the composition is applied to the soil pre-emergence or post-emergence of the noxious or undesirable plants, before or after seeding, or also intercrop or inter-row.

7. The method of claim 1, in which the composition is applied by spraying, sprinkling, or dispersion of powders and/or pellets.

8. The method of claim 1, in which benzyl alcohol is formulated in a composition comprising at least one phytopharmaceutically acceptable additive or excipient.

9. The method of claim 1, wherein the composition is in the form of an aqueous solution or a concentrated solution or suspension, an oily dispersion or in the form of microcapsules, powder or pellets.

10. The method of claim 8, wherein said additive or excipient is selected from a group consisting of: surfactants, antifoaming agents, preservatives, antimicrobial agents, anti-freezing agents, thickening agents, dyes, agents improving solubility and agents facilitating penetration and/or spread.

11. The method of claim 10, wherein the weight ratio between the total quantity of herbicide and surfactant can be comprised between 0.5:100 and 100:1.

* * * * *